United States Patent [19]
Tozaki et al.

[11] Patent Number: 5,729,516
[45] Date of Patent: Mar. 17, 1998

[54] INFORMATION RECORDING MEDIUM, APPARATUS FOR RECORDING THE SAME AND APPARATUS FOR REPRODUCING THE SAME

[75] Inventors: Akihiro Tozaki, Tsurugashima; Takao Sawabe, Tokyo-to; Ryuichiro Yoshimura, Tokorozawa; Yoshiaki Moriyama; Kaoru Yamamoto, both of Tsurugashima; Junichi Yoshio, Tokorozawa, all of Japan

[73] Assignee: Pioneer Electronic Coporation, Tokyo-to, Japan

[21] Appl. No.: 815,162

[22] Filed: Mar. 11, 1997

[30] Foreign Application Priority Data

Mar. 12, 1996 [JP] Japan .................................. 8-055159

[51] Int. Cl.$^6$ ........................................................ G11B 3/90
[52] U.S. Cl. ........................... 369/58; 369/84; 369/275.3
[58] Field of Search ................................. 369/47, 48, 53, 369/54, 58, 84, 85, 275.3, 275.1; 360/15

[56] References Cited

U.S. PATENT DOCUMENTS

| 5,453,968 | 9/1995 | Veldhuis et al. | 369/84 |
| 5,538,773 | 7/1996 | Kondo | 369/275.1 |

*Primary Examiner*—Paul W. Huber
*Attorney, Agent, or Firm*—Morgan, Lewis & Bockius LLP

[57] ABSTRACT

In a recording medium such as a DVD, various information such as video and audio information is recorded in a form of a plurality of recorded information pieces. Further, control information pieces prescribe the manner of reproducing the recorded information pieces. Copy information indicating whether or not the recorded information pieces are copy-prohibited is prepared and recorded for each of the recorded information pieces. In addition, aggregate copy information pieces indicating whether or not the recorded information pieces under the control by the control information piece are copy-prohibited are recorded. In accordance with the copy information and the aggregate copy information pieces, a copying system performs accurate copy management.

9 Claims, 10 Drawing Sheets

FIG.1
PHYSICAL STRUCTRE OF RECORD INFORMATION
(PHYSICAL FORMAT)
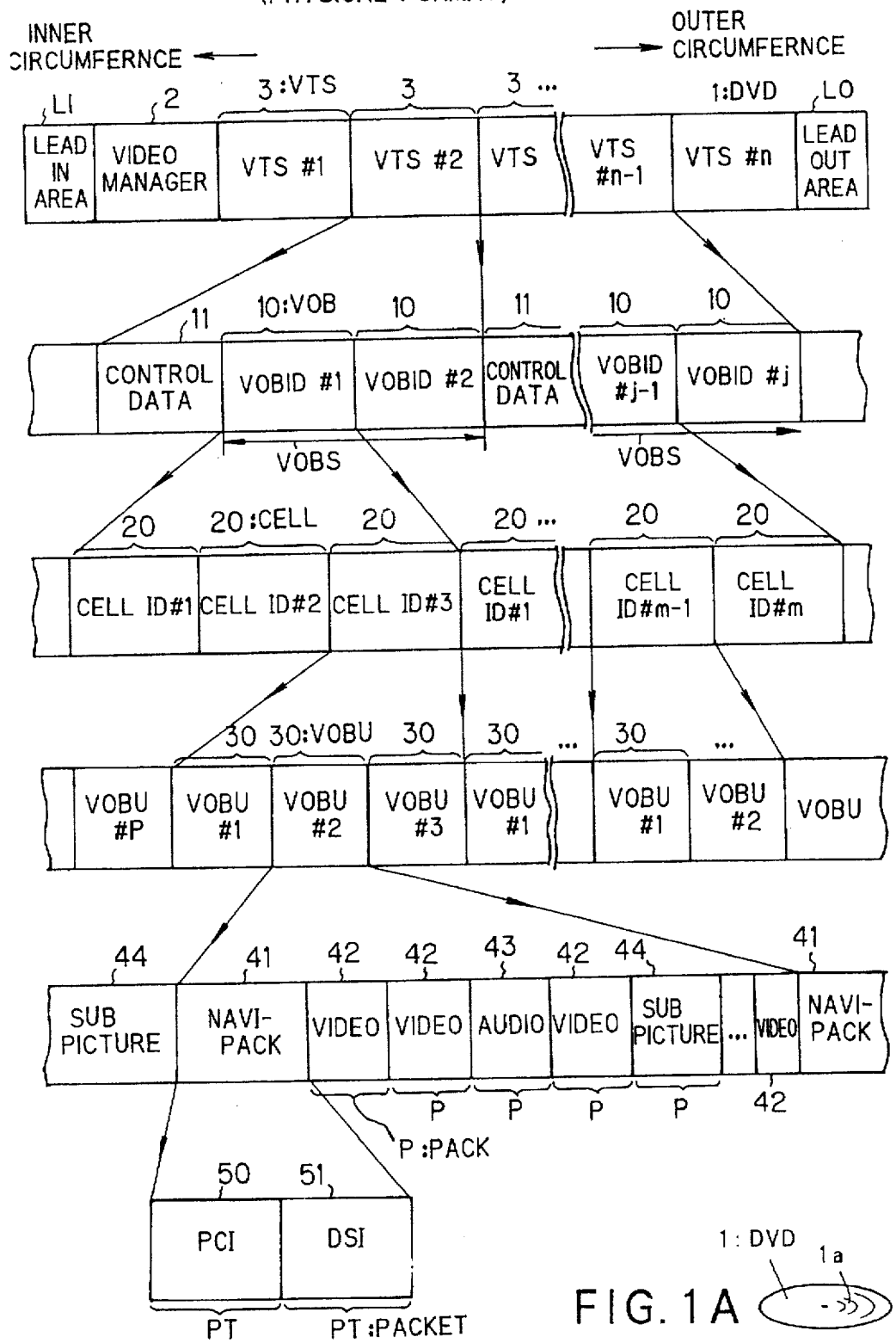
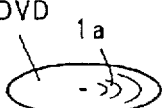
FIG.1A

LOGICAL STRUCTRE OF RECORD INFORMATION
(LOGICAL FORMAT)

COPY FLAG (CF1-CF3)
  00: WHOLLY COPY PROHIBITED
  01: PARTIALLY COPY PROHIBITED
  10: (RESERVED)
  11: WHOLLY COPY PERMITTED

VIDEO COPY INFORMATION (CV)
  00 : COPY PROHIBITED
  01 : COPY PERMITTED ONLY ONCE
  10 : (RESERVED)
  11 : COPY PERMITTED FOR UNLIMITED TIMES

AUDIO COPY INFORMATION (CA)
  00 : COPY PROHIBITED
  01 : COPY PERMITTED ONLY ONCE
  10 : (RESERVED)
  11 : COPY PERMITTED FOR UNLIMITED TIMES

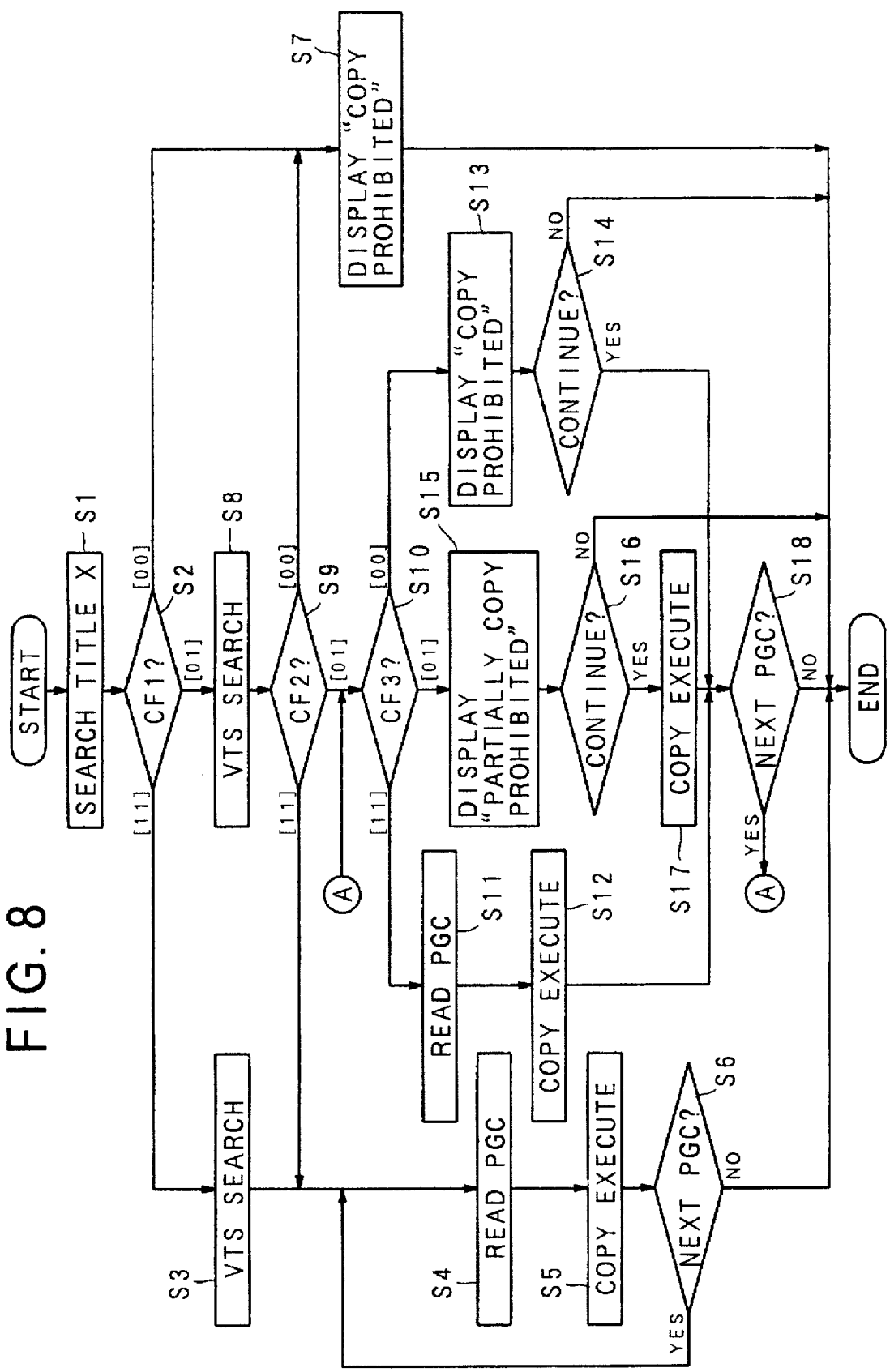

INFORMATION RECORDING MEDIUM, APPARATUS FOR RECORDING THE SAME AND APPARATUS FOR REPRODUCING THE SAME

BACKGROUND OF THE INVENTION

1. Field of the Invention

The present invention relates to an information recording medium such as an optical disk of a high recording density type, which is capable of recording information such as video information, audio information and the like at a high density, and which is represented by a DVD (Digital Video or Versatile Disk). The present invention also relates to a recording apparatus for recording the information onto the information recording medium, and a reproducing apparatus for reproducing the information from the information recording medium. Particularly, the present invention relates to a control of copying information recorded on the information recording medium.

2. Description of the Related Art

Conventionally, a so-called CD (Compact Disk) and a so-called DAT (Digital Audio Tape) are generally known as an information recording medium on which information is recorded in a digital manner. With the use of the recording medium from which information can be reproduced in the digital manner, record information can be digitally copied therefrom to other recording medium by a reproduction device or a recording device which are provided with digital interface adapted to a digital signal. However, unlimited number of digital copies thus produced cause unlimited distribution of copied information of non-deteriorated quality and invade the copy right of the owner. On the other hand, there are some software which digital copying are allowable for the purpose of the broad distribution to the public.

In DAT, a Serial Copy Management System (hereinafter referred to as "SCMS") has already been established to prohibit the unlimited digital copying. In the SCMS system, a 2-bit copy flag, indicating the prohibition or permission of the digital copying, is multiplexed repeatedly with given time intervals into audio data to be recorded on DAT. For example, the copy flag is defined as follows:

"00" : copy prohibited
"01" : copy permitted only once
"10" : (Reserved)
"11" : copy permitted The copy management processing according to the above SCMS system will be described below with respect to a case of using two DATs, a reproduction DAT and a recording DAT. First, if the copy flag is "00", the reproduction DAT notifies its digital interface (digital output means) that the copy of the information is prohibited. The digital interface multiplexes an information indicating that the copy of the information is prohibited to the reproduced audio data with given time intervals and supplies the multiplexed audio data to the recording DAT. The recording DAT detects the information indicating the copy prohibition included in the audio data and does not carry out recording of the supplied audio data. In this manner, the digital copy is prohibited.

If the copy flag is "01", the digital copy is permitted only once. In this case, the reproduction DAT notifies its digital interface that the digital copy of the information is permitted only once. The digital interface multiplexes the information indicating that the digital copy of the information is permitted only once with the reproduced audio data, and the audio data is supplied to the recording DAT. When detecting the information indicating the only-once copy permission, the recording DAT changes the copy flag multiplexed with the audio data to "00" (copy prohibited), and then records the audio information with the changed copy flag on the DAT. With this treatment, information can not be digitally copied from this child DAT to another DAT because the copy flag recorded on this child DAT is changed to "00" (copy prohibited). Namely, it is not possible to further produce a child DAT using this child DAT as a parent DAT. In this manner, the digital copy is permitted only once and further digital copy is prohibited.

Next, if the copy flag is "11", the reproduction DAT notifies its digital interface that the copy of the information is permitted. The digital interface multiplexes an information indicating that the copy of the information is permitted with the reproduced audio data with given time intervals and supplies the multiplexed audio data to the recording DAT. The recording DAT detects the information indicating the copy permission in the audio data and carries out recording of the supplied audio data. In this manner, the digital copy is performed.

Since DVD is capable of digital reproduction similarly to DAT, it is necessary to prohibit unlimited digital copy like the case of DAT. Basically, the above described SCMS technique is also applied to DVD copy management. Namely, the copy flag is set for each information unit of video or audio to be recorded.

However, if the copy flag is set for each information unit, the contents of the copy flag, i.e., to which status among copy prohibited, only-once permitted and copy permitted the copy flag is set, is unknown until the corresponding information unit is actually reproduced for the purpose of copying. In this view, when a plurality of information units, including some copy-prohibited units, are copied, only the copy-permitted information units are copied to a child DVD and the copy-prohibited information units may be missing in the child DVD. It is a significant problem that such a fault cannot be recognized until the copying is actually performed because it may be a vain copy operation.

One conceivable countermeasure to avoid such vain copy operation is to design the system such that the recording or reproducing device notifies the user as to whether or not the copy is actually being performed during the copy operation. However, even with the treatment, the user cannot know the capability of copying until the copy prohibited information unit is found during the copy operation. In other words, the user can not know the permissibility of copy before starting the copy operation.

SUMMARY OF THE INVENTION

It is an object of the present invention to provide an information recording medium, a recording and reproducing apparatus of the same, with which the permissibility of digital copying the subject information is known before actually starting the copy operation.

It is noted that, the following description is directed to the management and the prohibition of digital copying and hence the word "copy" or "copying" used means digital copy or copying.

According to one aspect of the present invention, there is provided an information recording medium including a data structure stored therein and including: a plurality of recorded information pieces each of which being independent of each other; a plurality of individual copy information pieces each corresponding to each one of the recorded information pieces, each of the individual copy information pieces indicating whether or not each of the corresponding recorded information pieces is copy-prohibited; a plurality of control information pieces each prescribing a control method of reproducing the plurality of recorded information pieces, groups of the plurality of control information pieces constituting hierarchical multiple layers, the plurality of control information pieces comprising aggregate copy information pieces prescribing whether or not the plurality of recorded information pieces controlled by the control information piece include copy-prohibited recorded information piece.

In accordance with the information recording medium thus configured, the control information pieces for reproducing the plurality of recorded information pieces are configured in the hierarchical structure of multiple layers, and each of the control information piece includes the aggregate copy information pieces which prescribe whether or not the plurality of recorded information pieces controlled by the control information piece include copy-prohibited recorded information piece. Therefore, the information relating to the prohibition and permission of copying can be set for each layers of the hierarchical structure, thereby enabling effective copy management.

In the information recording medium, each of the aggregate copy information pieces may include one of the following three types of information: a first type information indicating that all of the recorded information pieces are copy-permitted; a second type information indicating that all of the recorded information pieces are copy-prohibited; and a third type information indicating that the recorded information pieces include copy-permitted information piece and copy-prohibited information piece.

In the information recording medium, each of the plurality of individual copy information pieces may include one of the following copy information pieces: a first individual copy information piece indicating that the recorded information piece is copy-permitted only once; and a second individual copy information piece indicating that the recorded information piece is copy-permitted for unlimited times.

In the information recording medium, the control information pieces at each hierarchical layer may include the aggregate copy information pieces.

According to another aspect of the present invention, there is provided a reproducing apparatus for reproducing information from an information recording medium described above, the apparatus including: a copy instruction inputting unit for inputting a copy instruction and a designation of a copy-subject information to be copied; a copy information detecting unit for detecting the aggregate copy information pieces relating to the copy-subject information in an order from the ones at upper hierarchical layer to ones at lower hierarchical layer; and a notifying unit for immediately notifying the user that the copy-subject information copy-prohibited if the copy information detecting unit detects that all of the recorded information pieces corresponding to the copy-subject information are copy-prohibited.

In accordance with the reproducing apparatus thus configured, the copy information detecting unit detects the aggregate copy information pieces from the upper layer of the hierarchical structure. The notifying unit immediately notifies the copy prohibition if all of the recorded information pieces controlled by certain control information pieces are copy-prohibited. Therefore, the user can immediately know that the copy is prohibited, and it is possible to avoid the vain copy operation.

The reproducing apparatus may further include an output unit for immediately outputting recorded information pieces corresponding to the copy-subject information if the copy information detecting unit detects that all of the recorded information pieces corresponding to the copy-subject information are copy-permitted. Thus, the output unit immediately outputs the recorded information pieces corresponding to the copy-subject information, and therefore the copy operation can be rapidly performed.

The reproducing apparatus may be configured so that the copy information detecting unit detects the aggregate copy information pieces at lower hierarchical layers when it detects that at least one of the recorded information piece corresponding to the copy-subject information is copy-prohibited. By this, the copy operation can be immediately started if all recorded information pieces are copy-permitted, and the notification of copy-prohibition can be immediately made to the user if all recorded information pieces are copy-prohibited. Therefore, the copy operation may be performed effectively and rapidly.

The reproducing apparatus may further include an output unit for referring to the individual copy information pieces and outputting the recorded information pieces which are copy-permitted if the copy information detecting unit detects that at least one of the plurality of recorded information pieces controlled by the control information piece at the lowest hierarchical layer is copy-prohibited. By this, only the copy-permitted recorded information pieces are accurately copied.

According to still another aspect of the present invention, there is provided an information recording apparatus including: a first information producing unit for producing a plurality of recorded information pieces each of which being independent of each other; a second information producing unit for producing a plurality of individual copy information pieces prescribing whether or not the individual recorded information pieces are copy-prohibited; a third information producing unit for producing a plurality of control information pieces prescribing a control method of reproducing the plurality of recorded information pieces; a hierarchical layer structure producing unit for aggregating the plurality of control information pieces to form a multiple layer hierarchical structure of the control information pieces; a fourth information producing unit for referring to the individual copy information pieces to produce aggregate copy information pieces prescribing for each of the control information pieces whether or not the plurality of recorded information pieces controlled by the control information piece include copy-prohibited recorded information piece; and an arranging unit for arranging the recorded information pieces, the individual copy information pieces, the control information pieces and the aggregate copy information pieces on an information recording medium.

In accordance with the recording apparatus thus configured, the first to third information piece producing units produce the recorded information pieces, the individual copy information pieces and the control information pieces, respectively, and the hierarchical layer structure producing unit forms a multiple layer hierarchical structure. Therefore, the information relating to the prohibition and permission of copying may be set for each of the multiple layers of the hierarchical structure.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 1 is a diagram illustrating a recording (physical) format of a DVD according to an embodiment of the present invention;

FIG. 1A shows a formation of track on a DVD;

FIG. 8 is a flowchart illustrating a copy management according to the present invention.

DETAILED DESCRIPTION OF THE PREFERRED EMBODIMENTS

Figure 2:
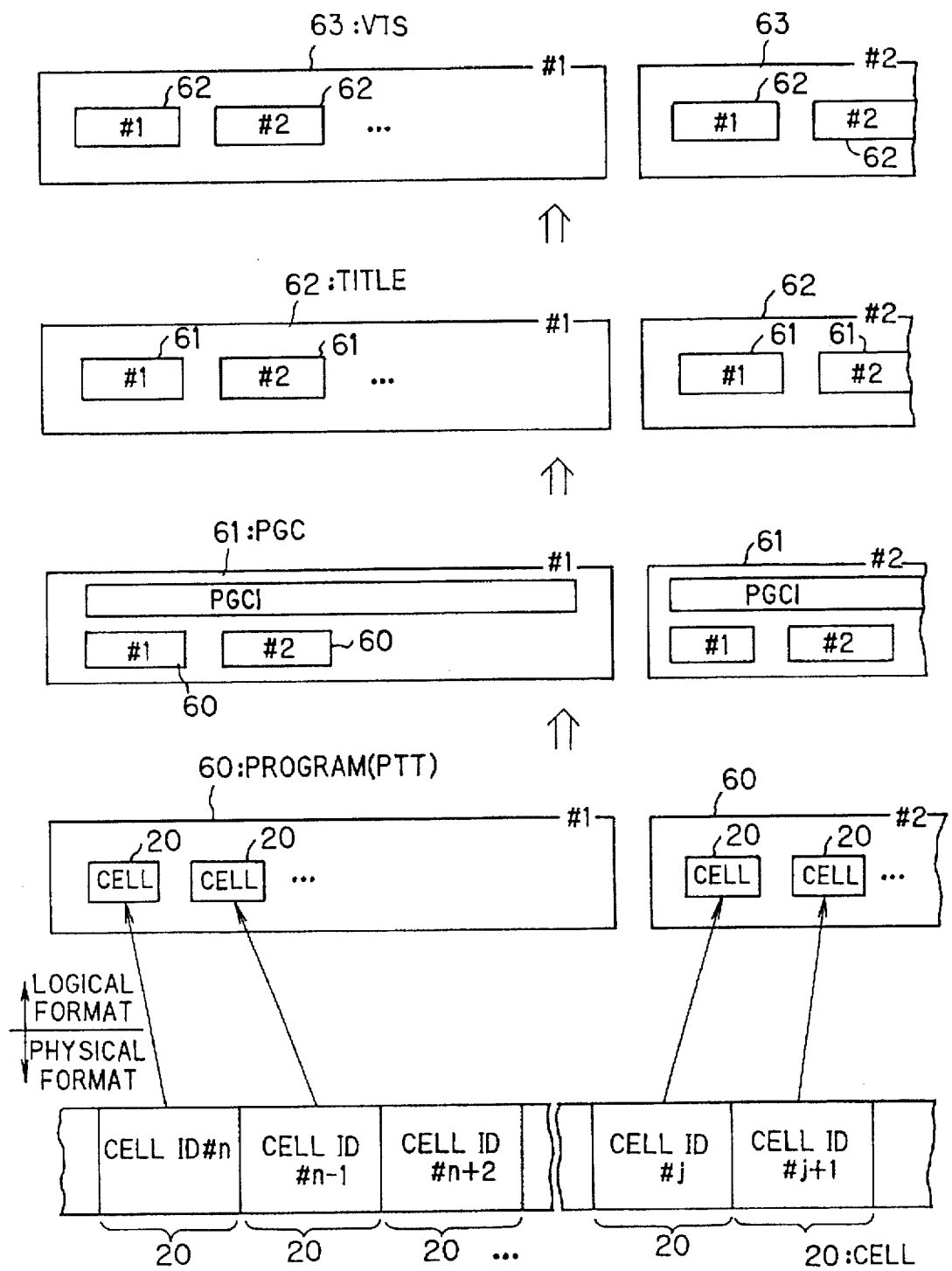
FIG. 2 is a diagram illustrating a logical format of a DVD according to an embodiment of the present invention.

Referring to the accompanying drawings, embodiments of the present invention will be now explained. The following explanations will be done for the embodiments, in which the present invention is applied to the aforementioned DVD.

In the following embodiments, constitutional elements listed on a right hand side in a following list respectively construct examples of constitutional elements of the present invention listed on a left hand side in the following list.

1) Recorded information piece: VOBU (VOB(Video Object)Unit)

2) Individual copy information piece: video copy information and audio copy information 3) Control information: PGC and other control information at upper hierarchical layers (e.g., control data, video manager)

4) Aggregate copy information piece: copy flag

[I] Embodiment of Information Record Medium

First of all, a physical structure and a logical structure as well as an operation of a DVD, as one embodiment of the information recording medium to which the present invention is applied, will be explained with reference to FIGS. 1 to 3.

At first, a record format of video information and audio information on the DVD (i.e. a physical record format) is explained by use of FIG. 1. As shown in FIG. 1A, a DVD is formed with spiral tracks 1a along which information is recorded.

As shown in FIG. 1, a DVD 1 as the present embodiment is provided with a lead in area LI at its most inner circumferential portion and a lead out area LO at its most outer circumferential portion, between which video information and audio information are recorded such that they are divided into a plurality of VTSs 3, each of which has a unique ID (Identification) number (i.e. VTS#1 to VTS#n). Here, the VTS (Video Title Set) 3 is a set (bundle) of titles (each of which is one production or one work which an author or producer intends to offer to the audience), which are related to each other (e.g., which attribute, such as the number, the specification, the corresponding languages etc. of audio and video streams is the same to each other). More concretely, a plurality of movies which are related to the same movie to each other but which languages of serifs (lines) are different from each other may be recorded as different titles respectively, or even in case of the same movies, the theater version and the special version may be recorded as different titles respectively. Ahead of the area where the VTSs 3 are recorded, a video manager 2 is recorded as shown in FIG. 1. As the information recorded in the video manager 2, for example, information related to the whole video and audio information recorded on the DVD 1, such as a menu for accessing each title, information for preventing an illegal copy, an access table for directly accessing each title and so on, is recorded.

One VTS 3 is recorded such that it is divided into a plurality of VOBs 10, each of which has an ID number (VOB ID#1, VOB ID#2, ...), and control data 11 disposed ahead of the VOBs 10. Here, a data portion constructed by a plurality of VOBs 10 is defined as a VOB set (VOBS) as shown in FIG. 1. This VOB set is defined to distinguish the VOB 10, which constructs one portion of the VTS 3 as the substantial portion of the video and audio information, from the control data 11, which constructs another portion of the VTS 3.

In the control data 11 recorded at the head of the VTS 3, information such as PGCI (ProGram Chain Information), which is various information related to a program chain as a logical division obtained by combining a plurality of cells (the "cell" will be described later in detail), is recorded. In each VOB 10, the substantial portion of the video and audio information (i.e. the video and audio information itself other than control information) besides the control information are recorded. Further, one VOB 10 is constructed of a plurality of cells 20, each of which has an ID number (cell ID#1, cell ID#2, ...). Here, one VOB 10 is constructed such that it is completed by the plurality of cells 20 and that one cell 20 does not strides over two VOBs 10.

Nextly, one cell 20 is constructed of a plurality of VOB units (VOBUs) 30, each of which has an ID number (VOBU#1, VOBU#2, ...). Here, the VOB unit 30 is an information unit, each of which includes the video information, the audio information and sub picture information (which is defined as information of a sub picture such as a subtitle of a movie etc.).

One VOB unit 30 is provided with: a navi-pack (a navigation pack) 41 for the control information; a video pack 42 for the video information; an audio pack 43 for the audio information; and a sub picture pack 44 for the sub picture information. Here, in the video pack 42, a packet including the video data is recorded. In the audio pack 43, a packet including the audio data is recorded. Further, in the sub picture pack 44, a packet including graphics such as a character and a diagram as the sub picture, is recorded. It is prescribed by a standard specification of the DVD that there are 8 kinds of audio recordable on the DVD 1 while 32 kinds of sub picture recordable on the DVD 1.

Further, the information is recorded such that the reproduction time of one VOBU 30 (i.e., data recorded between one navi-pack 41 and another navi-pack 41 neighboring thereto) becomes longer than 0.4 seconds.

Further, there always exists the navi-pack 41 in one VOBU 30. On the other hand, there may not exist each of the video pack 42, the audio pack 43 and the sub picture pack 44 in one VOBU 30, or, even in case that these packs exist in one VOBU 30, the number of the packs and the order of the packs are freely determined.

Finally, the navi-pack 41 is provided with: a DSI (Data Search Information) packet 51 including search information to search a video image or an audio sound desired to be displayed or sound-outputted (concretely, search information such as an address, where the video or audio to be displayed or sound-outputted is recorded, on the DVD 1); and a PCI (Presentation Control Information) packet 50 including information related to a display control at a time of displaying the video image or outputting the audio sound, which is searched on the basis of the information of the DSI packet 51. Further, all video data 42 included in one VOBU 30 consist of at least one GOP (Group Of Pictures). In the PCI packet 50, high light information, which defines a display or operation at a time when one selection item is selected out of selection items by the audience, is included. By the high light information, for example, the change of the picture plane display as well as the display position to be changed with respect to the selection item selected on a special picture plane of selection items (i.e. a so-called menu picture plane) for the audience to select, and the command corresponding to the selected item (i.e. a command to be performed in correspondence with the selected item) are set.

The video information to construct and display a frame, a selection button and the like, which is required to construct and display the menu picture plane, is recorded in the sub picture pack 44 as the sub picture information.

Further, the above described GOP is a minimum picture unit, which can be independently reproduced and which is determined based on the MPEG (Moving Picture Experts Group) 2 method. The MPEG 2 method is a picture compression method adopted at a time of recording the video information onto the DVD 1 in the present embodiment.

In the above explained record format having a hierarchical structure as shown in FIG. 1, each division can be freely set according to the author's intention, so as to perform recording on the basis of these set divisions. By performing the reproduction on the basis of a later described logical structure for each of these divisions, the variegated reproduction can be performed.

Nextly, a logical format (logical structure) constructed by combining the information recorded by the physical divisions shown in FIG. 1 is explained with reference to FIG. 2. The information is not actually recorded on the DVD 1 in the logical structure of FIG. 2. Instead, information (e.g. access information or time information) to reproduce each data shown in FIG. 1 by combining them (especially combining the cells 20) in the logical structure shown in FIG. 2, is recorded on the DVD 1, especially in the control data 11.

Figure 3:
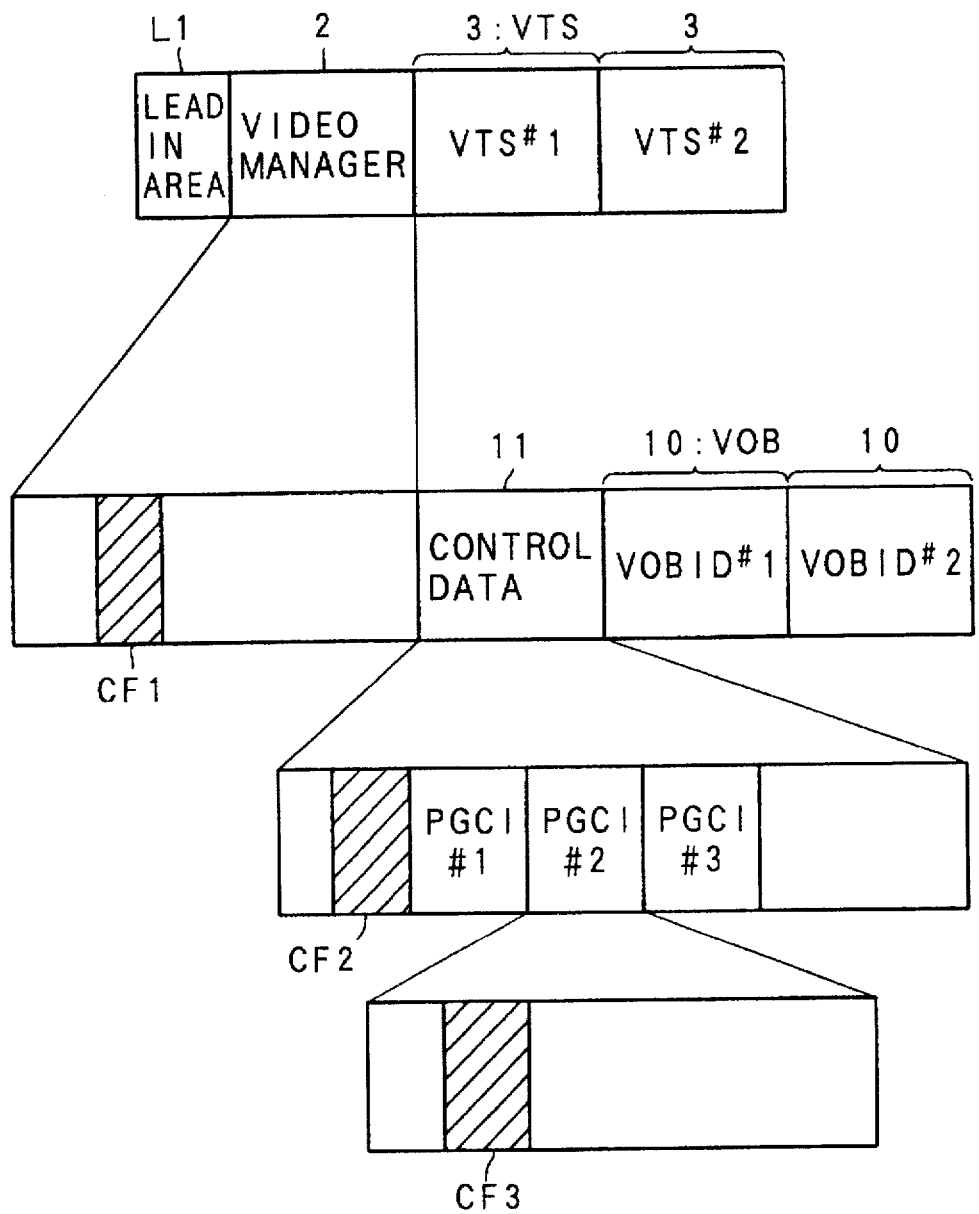
FIG. 3 is a diagram illustrating recorded positions of copy flags and an example of copy flag setting.

To make the explanation clear, the following explanation is made from the lower hierarchical layer in FIG. 2. One program 60 is logically constructed on the basis of the author's intention by selecting and combining a plurality of cells 20 among the physical structures explained by use of FIG. 1. The program 60 is also a minimum logical unit, which division can be identified by a system controller of a reproducing apparatus described later and which can be accessed by use of a command by the system controller. It is also possible for the author to define a gathering of one or more programs 60 as a minimum unit, which can be freely selected to be watched or listened to by the audience and which is referred to as a PTT (ParT Of Title).

Since one program 60 is logically constructed by selecting a plurality of cells 20, it is possible to use one cell commonly for a plurality of programs 60, namely to perform a so-called "alternative usage" of the cell 20 in which one cell 20 is reproduced in a plurality of different programs 60.

Here, as for the number of each cell 20, at a time of treating the cell 20 on the physical format shown in FIG. 1, the number is treated as the cell ID number (which is indicated by cell ID # in FIG. 1). On the other hand, at a time of treating the cell 20 on the logical format shown in FIG. 2, the number is treated as the cell number in the order of description in the PGCI described later.

Next, by combining a plurality of programs 60, one PGC (Program Chain) 61 is logically constructed on the basis of the author's intention. The aforementioned PGCI (ProGram Chain Information) is defined by a unit of the PGC 61. The PGCI includes information indicating: the reproduction order for each program 60 at a time of reproducing each program 60 (by this reproduction order, a unique program number (#1, #2, . . . ) is assigned to each program 60); the reproduction order for each cell 20 (by this reproduction order, a unique cell number is assigned to each cell 20); an address which is a record position of each cell 20 on the DVD 1; the number of the cell 20 positioned at the head of one program 60 to be firstly reproduced; a reproduction method for each program 60; and various commands (e.g. commands able to be specified by the author for each PGC 61 or each cell 20). The recording position of the PGCI on the DVD 1 may be in the control data 11 as aforementioned, or in a control data (not illustrated) in the video manager 2 if the pertinent PGCI is related to the menu in the video manager 2 (refer to FIG. 1).

In one PGC 61, the substantial video and audio data etc. are included as a combination of the programs 60 (in other words, the combination of the cells 20) other than the above mentioned PGCI.

Further, in one PGC 61, it is possible to perform the alternative usage of the cell 20 as explained before in the explanation for the program 60 (i.e. such a usage that the same cell 20 is commonly used by a plurality of different PGC 61). As the method of reproducing the cell 20 to be used, the author can select a method of reproducing the cells 20 in an order regardless of the recording order on the DVD 1 (i.e. the method of reproducing the cells discontinuously araread, for example, the method of reproducing the cell 20 prior which is recorded posterior on the record track) other than a method of reproducing the cell 20 in the recording order on the record track on the DVD 1 as it is (i.e. the method of reproducing the cells continuously araread).

Then, one title 62 is logically constructed of one or a plurality of PGCs 61 (PGC #1, PGC#2, . . . ) as shown in FIG. 2. The title 62 is, for example, a unit corresponding to one movie, and is completed information which the author would like to offer to the audience of the DVD 1.

Finally, one VTS 63 is logically constructed of one or a plurality of titles 62 (title #1, title #2, . . . ) as shown in FIG. 2. The title 62 included in the VTS 63 has the attributes common to each other. For example, the movies based on one movie but in different languages correspond to the respective titles 62. The information included in one VTS 63 shown in FIG. 2 corresponds to information included in one VTS 3 shown in FIG. 1. Namely, all information included in the logical VTS 63 shown in FIG. 2 is recorded as one VTS in the DVD 1 shown in FIG. 1.

As the author specifies the information divided in the physical structure on the DVD 1 on the basis of the above described logical format, the video image (e.g. the movie image) for the audience to watch is to be formed.

Since it is necessary to record information on various and multiple hierarchical layers described above, information according to the aforementioned recording format is particularly preferred for a large capacity information recording medium, such as an optical disc like DVD, on which sounds and/or subtitles of various kinds of languages for a single movie is recordable together with information of the movie itself.

Next, out of the video and audio information according to the above described physical and logical structures, information related to the copy management according to the present invention will be described below in details.

In the present invention, a copy flag, video copy information and audio copy information are introduced as the information related to the copy management.

The copy flag is recorded on the multiple hierarchical layers described above. FIG. 3 shows the positions at which the copy flags are recorded. As shown, the copy flags are recorded in the video manager 2, the control data 11 and the PGCI. The copy flag CF1 recorded in the video manager 2 is the information of 2 bits, and prescribes the copy permissibility of the record information under the management by the video manager 2, that is, video and audio information. The copy flag CF1 of "00" indicates that the copy is wholly prohibited. Namely, any information under the management by the video manager 2 is prohibited to be copied to other recording medium. The copy flag CF1 of "11" indicates that the copy is wholly permitted. Namely, all information under the management by the video manager 2 is permitted to be copied to other recording medium. The copy flag CF1 of "01" indicates that the copy is partially prohibited. Namely, some portions of the information under the management by the video manager 2 are permitted to be copied to other recording medium, and the other portions are prohibited to be copied. In other words, the information under the video manager 2 includes the copy-permitted information-portions and the copy-prohibited information portions.

When the user copies all information recorded on a certain DVD to other recording medium, the system for performing the copy first refers to the copy flag CF1. If the copy flag CF1 is "00", the system recognizes that all information on the DVD is copy-prohibited and immediately notifies the user of that by displaying a warning or other manners. Therefore, the user does not have to wait for a long time to know the permissibility of copying. It is noted that "copy permitted" in the copy flag CF1 includes the case in which the copy is permitted only once and the case in which the copy is permitted for unlimited times. The limitation of the times of copying is prescribed by the video copy information and the audio copy information which will be described later in detail.

The copy flag is also recorded within the control data 11 in each VTS 3. This is referred to as copy flag CF2 which is also 2 bits information like the copy flag CF1 and prescribes the copy permissibility of the information under the management by the control data 11. The copy flag CF2 of "00" indicates that the copy is wholly prohibited. Namely, any information under the management by the control data 11 is prohibited to be copied to other recording medium. The copy flag CF2 of "11" indicates that the copy is wholly permitted. Namely, all information under the management by the control data 11 is permitted to be copied to other recording medium. The copy flag CF2 of "01" indicates that the copy is partially prohibited. Namely, the information under the control data 11 includes the copy-permitted information portions and the copy-prohibited information portions.

The copy flag is further recorded within the PCGI in the control data 11. This is referred to as copy flag CF3, which is also 2 bits information like the copy flags CF1 and CF2 and prescribes the copy permissibility of the information under the management by the PCGI. The copy flag CF3 of "00" indicates that the copy is wholly prohibited. Namely, any information under the management by the PCGI is prohibited to be copied to other recording medium. The copy flag CF3 of "11" indicates that the copy is wholly permitted. Namely, all information under the management by the PCGI is permitted to be copied to other recording medium. The copy flag CF3 of "01" indicates that the copy is partially prohibited. Namely, the information under the PCGI includes the copy-permitted information portions and the copy-prohibited information portions.

As described above, the present invention is characterized in that the copy flags indicative of the copy permissibility are recorded on a plurality of layers in the hierarchical structure. As a result, information about the copy permissibility can be obtained individually for each information, which is managed as an information unit in each hierarchical layers, from the upper layers to the lower layers, and hence effective and accurate copy management can be achieved according to the size of the information to be copied.

Figure 4:
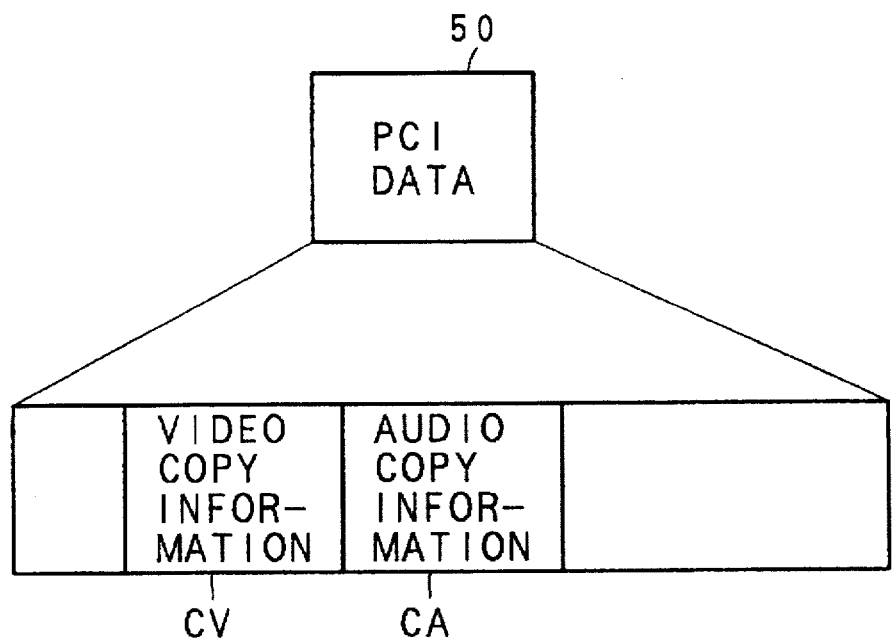
FIG. 4 is a diagram illustrating recorded positions of a video copy information and an audio copy information and examples of the copy information settings.

Next, the video and audio copy information will be described. In the PCI packet in the navi-pack 41, the video copy information and the audio copy information are recorded. FIG. 4 shows an example of recording the video copy information and the audio copy information. As shown, the video copy information CV and the audio copy information CA are 2 bits information, each prescribing the copy permissibility of the video data and the audio data, respectively. The navi-pack 41 is provided in each VOBU 30 as described above, and the video copy information CV prescribes whether or not the video information recorded in the VOBU 30, to which the video copy information CV belongs (i.e., video data 42, sub picture data 44, etc.), is copy-prohibited. Specifically, if the video copy information CV is "00", it means that copy of all video data within the VOBU 30, to which the video copy information CV belongs, to other recording medium is prohibited. If the video copy information CV is "01", it means that copy of all video data within the VOBU 30, to which the video copy information CV belongs, to other recording medium is permitted only once. Further, if the video copy information CV is "11", it means that copy of all video data within the VOBU 30, to which the video copy information CV belongs, to other recording medium is permitted for unlimited times.

Similarly, the audio copy information CA prescribes whether or not the audio information recorded in the VOBU 30, to which the audio copy information CA belongs (i.e., audio data 43), is copy-prohibited. Specifically, if the audio copy information CA is "00", it means that copy of all audio data within the VOBU 30, to which the audio copy information CA belongs, to other recording medium is prohibited. If the audio copy information CA is "01", it means that copy of all audio data within the VOBU 30, to which the audio copy information CA belongs, to other recording medium is permitted only once. Further, if the audio copy information CA is "11", it means that copy of all audio data within the VOBU 30, to which the audio copy information CA belongs, to other recording medium is permitted for unlimited times.

As described above, according to the recording medium of the present invention, since the video copy information CV and the audio copy information CA are recorded in the PCI packet 50 in the navi-pack 41, the copy permissibility of the recorded information may be prescribed by the unit of VOBU. Specifically, it is possible to set the copy permissibility by the unit of 0.4 seconds at minimum, and hence precise copy management may be achieved. Further, since the video copy information CV and the audio copy information CA are prescribed and recorded independently of each other, the copy management can be performed independently for the video data and the audio data. By way of example, only either one of the video information and the audio information may be set copy-prohibited within the same VOBU, and the freedom of variation in the copy management may be enhanced.

Next, the relationship between the copy flag and the video and audio copy information will be described below. As described above, the copy flag is recorded at a plurality of hierarchical layers of the DVD 1, and each copy flag prescribes the copy permissibility of information that is included in the information unit at the layer. Therefore, the contents of the copy flag recorded at the upper hierarchical layer are consistent with the contents of the copy flag recorded at the lower hierarchical layer thereof, and the contents of the copy flag at respective layers are consistent with the contents of the video copy information CV and the audio copy information CA recorded at the lowest layer.

More specifically, if the uppermost copy flag CF1 is "00", it means that all recorded data (concretely, titles) under the management by the video manager 2 is set to be copy-prohibited. Therefore, the copy flags CF2 and CF3 which are recorded at the lower layers thereof are all "00", indicating the copy is wholly prohibited, and the video copy information CV and the audio copy information CA (hereinafter referred to as "video/audio copy information") in the PCI packet 50 are "00" indicating the copy prohibition at any recording positions on the DVD 1.

If the uppermost copy flag CF1 is "11", it means that all recorded information under the management by the video manager 2 is set to be copy-permitted. Therefore, the copy flags CF2 and CF3 recorded at the lower layers thereof are all "11", indicating that the copy is wholly permitted. However, it is noted here that this "wholly permitted" includes both of the case in which the copy is permitted only once and the case in which the copy is permitted for unlimited times, and hence the video/audio copy information in the PCI packet 50 may be "01", indicating that the copy is permitted only once, or "11", indicating that the copy is permitted for unlimited times.

Figure 5:
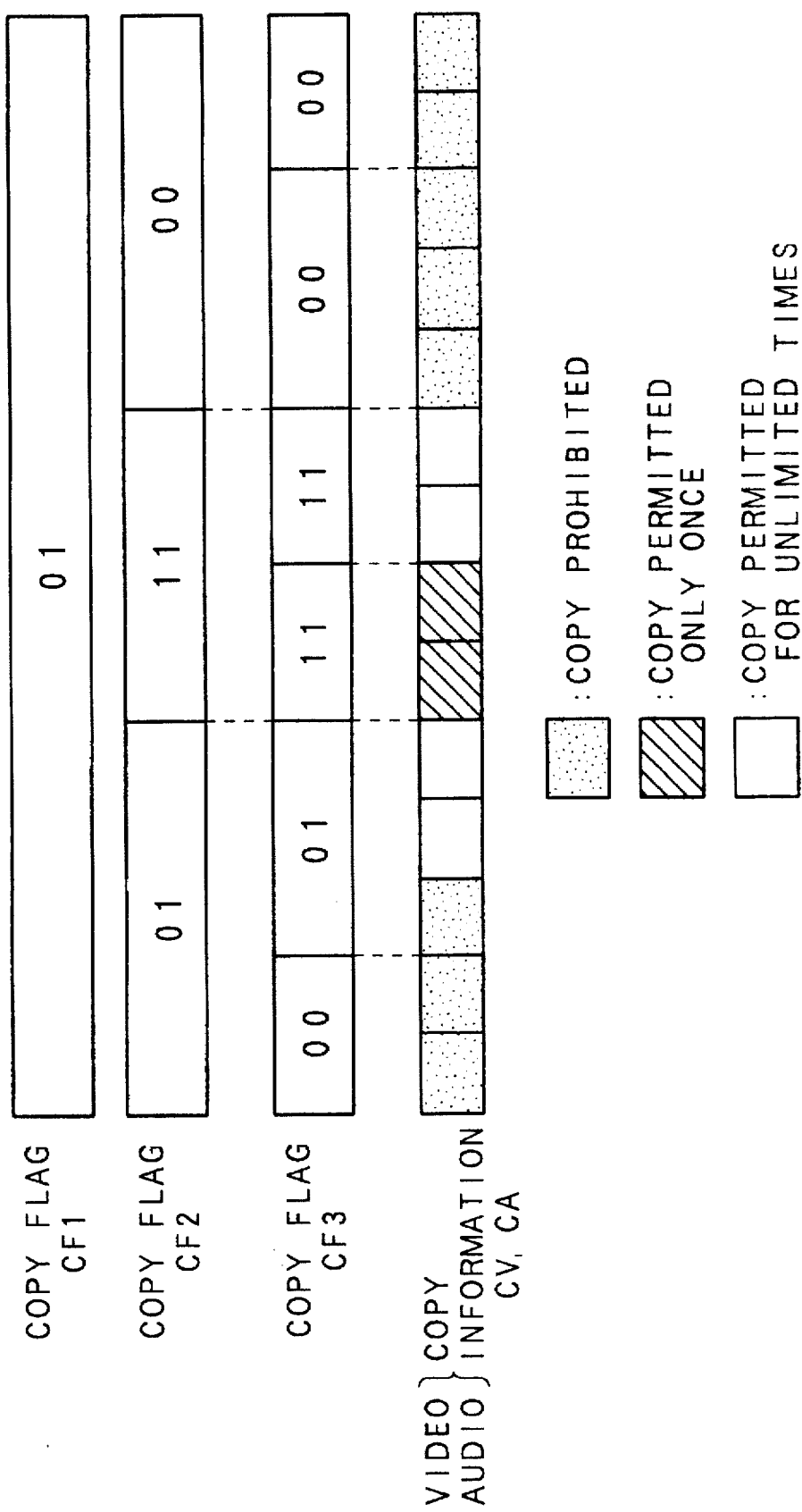
FIG. 5 is a diagram illustrating a relationship between the copy flag and the copy information.

Next, if the uppermost copy flag CF1 is "01", indicating that the copy is partially prohibited, the copy flags and the video/audio copy information recorded in the lower layers thereof may be classified into the patterns shown in FIG. 5. If the copy flag CF1 is "01", the copy flag CF2 recorded in the control data 11 in the VTS 3 may be one of "00" indicating the whole copy prohibition, "01" indicating the partial copy permission and "11" indicating the whole copy permission. If the copy flag CF2 is "00", all of the copy flags CF3 at lower layer must be "00" and all of the video/audio copy information within the area must be "00"

Next, if the copy flag CF2 is "11" indicating the whole copy permission, all of the copy flag CF3 at the lower layer thereof must be "11", indicating the whole copy permission. However, the video/audio copy information within the area may be either one of "01", indicating that the copy is permitted only once, and "11", indicating that the copy is permitted for unlimited times.

Finally, if the copy flag CF2 is "01", indicating the partial copy prohibition, the copy flag CF3 at the lower layer may be one of "00" indicating that the copy is wholly prohibited, "01" indicating that the copy is partially prohibited and "11" indicating that the copy is wholly permitted. In addition, in the area where the copy flag CF3 is "00", indicating that the copy is wholly prohibited, the video/audio copy information are all "00", indicating that the copy is wholly prohibited. On the other hand, if the copy flag CF3 is "01", indicating that the copy is partially prohibited, the video/audio copy information within the area may be one of the "00" indicating that the copy is wholly prohibited, "01" indicating that the copy is permitted only once and "11" indicating that the copy is permitted for unlimited times. If the copy flag CF3 is "11" indicating that the copy is wholly permitted, the video/audiocopy information within the area may be one of "01" indicating that the copy is permitted only once and "11" indicating that the copy is permitted for unlimited times.

[II] Embodiment of Recording Apparatus

Next, an embodiment of recording apparatus for recording the above mentioned control information including the copy flag and video/audio copy information, video information and audio information onto the DVD 1 will be explained with reference to FIG. 6.

At first, a construction and an operation of the recording apparatus as the embodiment is explained with reference to FIG. 6.

Figure 6:
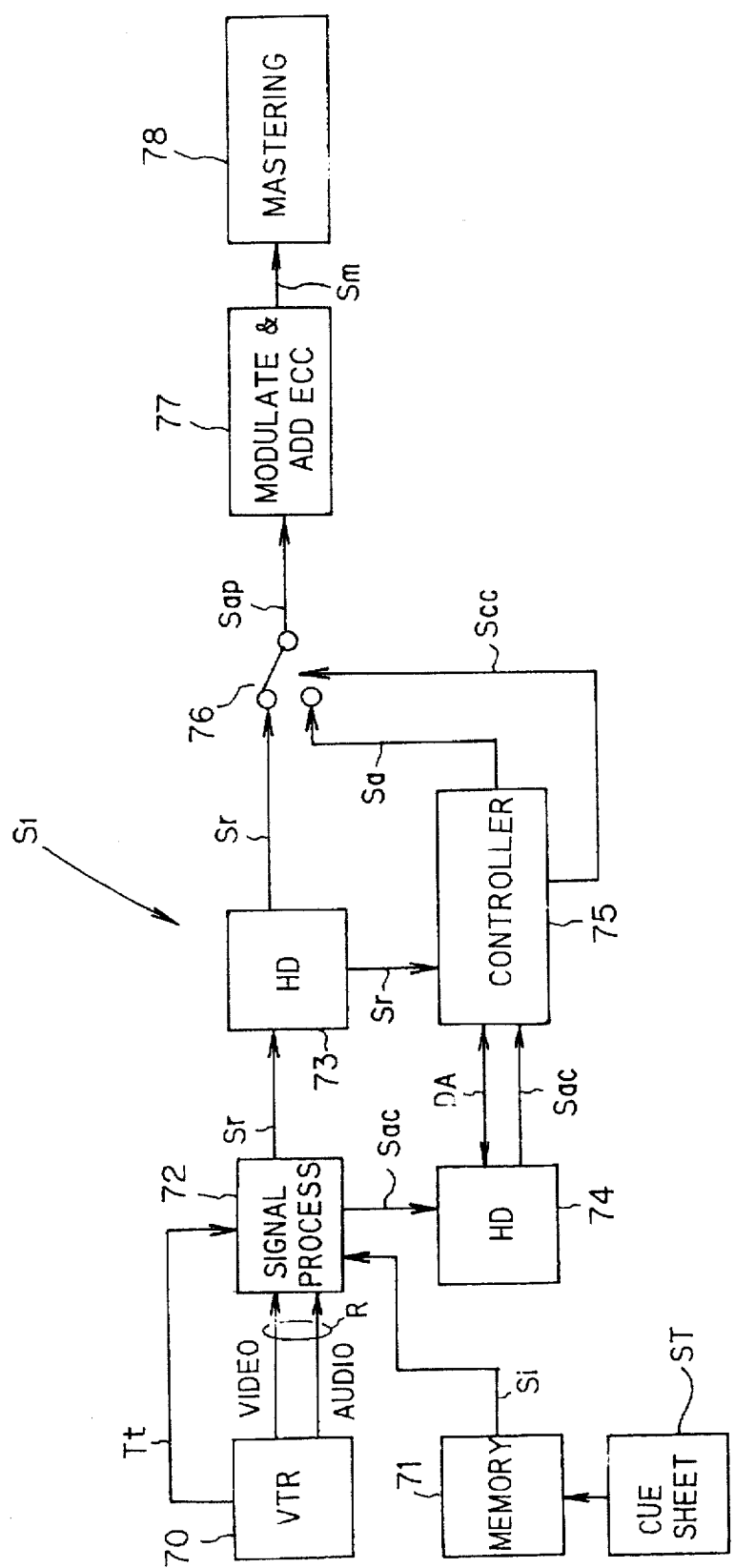
FIG. 6 is a block diagram illustrating a configuration of a DVD recording apparatus according to the present invention.

As shown in FIG. 6, a recording apparatus S1 as the present embodiment is provided with: a VTR (Video Tape Recorder) 70; a memory 71; a signal process unit 71; a hard disk (HD) device 73; a hard disk (HD) device 74; a controller 75; a multiplexer 76; a modulator 77; and a mastering device 78.

Nextly, an operation of the present embodiment is explained.

Record information R, which is a raw material such as audio information, video information etc. to be recorded on the DVD 1, is temporarily recorded in the VTR 70. Then, the record information R temporarily record in the VTR 70 is outputted to the signal process unit 72 by a request from the signal process unit 72.

The signal process unit 72 applies an A/D (Analog to Digital) converting process and a signal compressing process to the record information R outputted from the VTR 70, and time-axis-multiplexes the audio information and the video information to output it as a compressed multiplexed signal Sr. After that, the compressed multiplexed signal Sr outputted therefrom is temporarily stored into the hard disk device 73.

Along with this, the memory 71 classifies the record information R into a plurality of partial record information Pr in advance, and temporarily stores content information related to the partial record information Pr which is inputted beforehand on the basis of a cue sheet ST, on which the control information related to the partial record information Pr are written. Then, the memory 71 outputs it as a content information signal Si on the basis of a request from the signal process unit 72.

Then, the signal process unit 72 generates and outputs an access information signal Sac corresponding to the partial record information Pr with referring to a time code Tt, on the basis of the time code Tt corresponding to the record information R outputted from the VTR 70 and the content information signal Si outputted from the memory 71. Then, the access information signal Sac is temporarily stored in the hard disk device 74.

The above described processes are performed with respect to the whole record information R.

When the above described processes are finished as for the whole record information R, the controller 75 reads out the compressed multiplexed signal Sr from the hard disk device 73, reads out the access information signal Sac from the hard disk device 74, generates additional information DA on the basis of these read out signals, and stores the additional information DA into the hard disk device 74. The contents of the copy flag, the video copy information and the audio copy information are determined in advance by the author of the DVD 1, and stored in the hard disk device 74. Then, by the control of the signal process unit 72, the copy flag CF1 to CF3, the video copy information CV and the audio copy information CA are included in the additional information DA. Namely, the copy flag CF1 is included in the additional information DA as the information to be recorded in the video manager 2, the copy flag CF2 is included in the additional information DA as the information to be recorded in the control data 11 and the copy flag CF3 is included in the additional information DA as the information to be recorded in the PGCI. In addition, the video copy information CV and the audio copy information CA are included in the additional information DA as the information to be recorded in the PCI packet 50 in the navi-pack 41.

On the other hand, the controller 75 performs a time management for each of the operations of the signal process unit 72, the hard disk device 73 and the hard disk device 74, and reads out the additional information DA from the hard disk device 74, so that the controller 75 generates and outputs an additional information signal Sa corresponding to the read out additional information DA, and generates and outputs an information selection signal Scc to time-axis-multiplex the compressed multiplexed signal Sr and the additional information signal Sa.

After that, the compressed multiplexed signal Sr and the additional information signal Sa are time-axis-multiplexed by the multiplexer 76 to be outputted as an information added compressed multiplexed signal Sap. In the stage of the information added compressed multiplexed signal Sap, the information to be recorded is obtained by multiplexing the control signal and the video/audio information according to the switching operation by the controller 75 using the information selection signal Scc and is of the physical structure (physical format) shown in FIG. 1. It is noted that, if the sub picture information exists, it is inputted to the signal process unit 72 by other means such as a FD (Floppy Disk) device (not shown) to be processed in the same manner as the video and audio information.

Then, the modulator 77 adds an error correction code (ECC), such as a Reed Solomon code, and applies a modulation such as an eight to sixteen (8–16) modulation with respect to the information added compressed multiplexed signal Sap outputted from the multiplexer 76, and generates and outputs a disk record signal Sm to the mastering device 78.

Finally, the mastering device 78 records the disk record signal Sm to a stamper disk, which becomes a master (i.e. a cutting dye) for the production of an optical disk. Then, by use of this stamper disk, an optical disk as a replica disk, which can be on sale in the general market, i.e. the DVD 1, can be produced by a replication device not illustrated. In this way, the DVD 1 in which the copy flag CF1 to CF3, the video copy information CV and the audio copy information CA are recorded at the positions shown in FIGS. 3 and 4, respectively.

[III] Embodiment of Reproducing Apparatus

Next, an embodiment of a reproducing apparatus for reproducing the information recorded on the DVD1 by the above mentioned recording apparatus will be explained with reference to FIGS. 7 to 10.

At first, a construction and an operation of the reproducing apparatus as the embodiment is explained with reference to FIG. 7.

Figure 7:
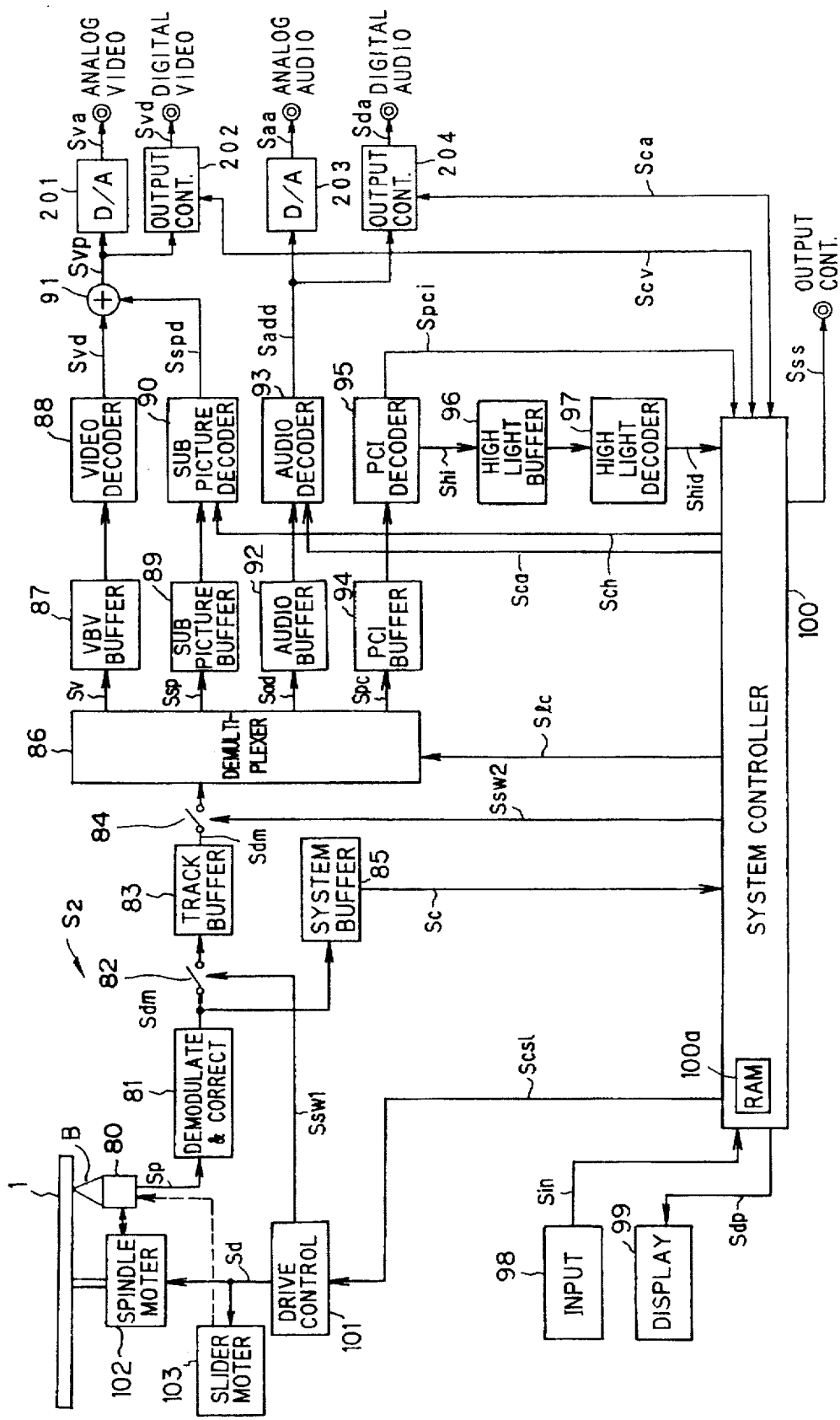
FIG. 7 is a block diagram illustrating a configuration of a DVD reproducing apparatus according to the present invention.

As shown in FIG. 7, a reproducing apparatus S2 as the present embodiment is provided with: an optical pickup 80; a demodulate and correct unit 81; stream switches 82 and 84; a track buffer 83; a system buffer 85; a demultiplexer 86; a VBV (Video Buffer Verifier) buffer 87; a video decoder 88; a sub picture buffer 89; a sub picture decoder 90; a mixer 91; an audio buffer 92; an audio decoder 93; a PCI (Presentation Control Information) buffer 94; a PCI decoder 95; a high light buffer 96; a high light decoder 97; an input unit 98; a display unit 99; a system controller 100; a drive controller 101; a spindle motor 102, a slider motor 103, D/A converters 201 and 203, and output control units 202 and 204. The construction shown in FIG. 7 only illustrates the portions related to the video and audio reproduction of the reproducing apparatus S2. The description and the detailed explanation as for servo circuits to servo-control the optical pickup 80, the spindle motor 102, the slider motor 103 and the like are omitted since they are constructed in the same manner as the conventional arts.

Nextly, an overall operation of the present embodiment is explained.

The optical pickup 80 includes a laser diode, a polarization beam splitter, an objective lens, a photodetector and the like not illustrated, and irradiates a light beam B as a reproduction light with respect to the DVD 1. The optical pickup 80 receives a reflection light of the light beam B from the DVD 1, and outputs a detection signal Sp corresponding to information pits formed on the DVD 1. At this time, the tracking servo control and the focus servo control are operated with respect to the objective lens etc. of the optical pickup 80 in the same manner as the conventional art so that the light beam B can be irradiated precisely onto the information track of the DVD 1 and that the light beam B can be focused on the information record surface of the DVD 1.

The detection signal Sp outputted from the optical pickup 80 is inputted to the demodulate and correct unit 81, where a signal demodulation process and an error correct process are applied to it to generate a demodulation signal Sdm, which is outputted to the stream switch 82 and the system buffer 85.

The opening and closing operation of the stream switch 82, to which the demodulation signal Sdm is inputted, is controlled by a switch signal Ssw1 from the drive controller 101. When it is closed, the stream switch 82 passes therethrough the inputted demodulation signal Sdm as it is to the track buffer 83. When it is opened, the demodulation signal Sdm is not outputted therethrough, so that unnecessary or useless information (signal) is not inputted to the track buffer 83.

The track buffer 83, to which the demodulation signal Sdm is inputted, consists of a FIFO (First In First Out) memory, for example. The track buffer 83 temporarily stores the inputted demodulation signal Sdm, and continuously outputs the stored demodulation signal Sdm when the stream switch 84 is closed. The track buffer 83 compensates for a difference or fluctuation in the data amount between respective GOP under the MPEG 2 method, and continuously outputs the demodulation signal Sdm, which is discontinuously inputted due to a track jump in the aforementioned seamless reproduction, in case of reading the data divided into the interleaved units IU, so as to avoid the interruption of the reproduction due to the discontinuity.

The opening and closing operation of the stream switch 84, to which the demodulation signal Sdm is continuously inputted, is controlled by a switch signal Ssw2 from the system controller 100 such that the various buffers at its posterior stage may not be over-flown or, on the contrary, may not become empty to stop the decoding process, in the separating process by the demultiplexer 86.

On the other hand, the system buffer 85, to which the demodulation signal Sdm is inputted in parallel with the track buffer 83, accumulates the video manager 2, the control data 11 of the VTS 3 and the like (refer to FIG. 1) which are detected firstly upon loading the DVD 1 and which are related to the whole information recorded on the DVD 1. Then, the system buffer 85 outputs the accumulated data as a control information Sc to the system controller 100, and temporarily stores the DSI packet 51 for each navi-pack 41 (refer to FIG. 1) as the occasion demands while reproducing the information, to output it also as the control information Sc. Therefore, the aforementioned copy flags CF1 to CF3 are outputted from the system buffer 85 as the control information Sc and accumulated in a RAM 100a provided in the system controller 100.

The demultiplexer 86, to which the demodulation signal Sdm is continuously inputted through the stream switch 84, separates the video information, the audio information, the sub picture information and the PCI packet 50 for each navi-pack 41, respectively, from the inputted demodulation signal Sdm, and outputs them as a video signal Sv, a sub picture signal Ssp, an audio signal Sad and a PCI signal Spc, respectively, to the VBV buffer 87, the sub picture buffer 89, the audio buffer 92 and the PCI buffer 94. There may be a case where, in the demodulation signal Sdm, different streams of the audio information or the sub picture information in a plurality of different languages are included as the audio or sub picture information. In that case, a desirable language is selected for the audio or sub picture information by a stream selection signal Sic from the system controller 100, so that the audio or sub picture information in the desirable language is outputted to the audio buffer 92 or the sub picture buffer 89.

The VBV buffer 87, to which the video signal Sv is inputted, consists of a FIFO memory, for example. The VBV buffer 87 temporarily stores the video signal Sv and outputs it to the video decoder 88. The VBV buffer 87 compensates for the difference or fluctuation in the data amount between respective pictures of the video signal Sv compressed by the MPEG 2 method. Then, the video signal Sv in which the differences in the data amount are compensated for is outputted to the video decoder 88, and is decoded by the MPEG 2 method to be outputted as a decoded video signal Svd to the mixer 91.

On the other hand, the sub picture buffer 89, to which the sub picture signal Ssp is inputted, temporarily stores the inputted sub picture signal Ssp, and outputs it to the sub picture decoder 90. The sub picture buffer 89 is to synchronize the sub picture information included in the sub picture signal Ssp with the video information corresponding to the sub picture information, and to output it. Then, the sub picture signal Ssp synchronized with the video information is inputted to the sub picture decoder 90 and is decoded to be outputted as a decoded sub picture signal Sspd to the mixer 91.

In a case where the sub picture signal Ssp includes video information to construct a frame, a selection button etc. for displaying the menu picture plane, the sub picture decoder 90 changes a display condition of the selection button etc. to be displayed, in the sub picture signal Sspd on the basis of a high light control information Sch from the system controller 100 to output it.

The decoded video signal Svd outputted from the video decoder 88 and the decoded sub picture signal Sspd outputted from the sub picture decoder 90 (which is in synchronization with the corresponding decoded video signal Svd) are mixed together by the mixer 91, and are outputted as a final video signal Svp to the D/A converter 201 and the output control unit 202. The video signal Svp is a digital signal, and the D/A converter converts it to an analog video signal Sva and outputs it. The output control unit 202 is controlled by a control signal Scv supplied from the system controller 100, and adds an additional information for the digital interface thereof to output a digital video signal Svd. While the contents of the control signal Scv is determined dependently upon the video copy information, the detail of which will be described later.

The audio buffer 92, to which the audio signal Sad is inputted, consists of a FIFO memory, for example. The audio buffer 92 temporarily stores the audio signal Sad and outputs it to the audio decoder 93. The audio buffer 92 is to synchronize the audio signal Sad with the video signal Sv or the sub picture signal Ssp including the corresponding video information, and delays the audio signal Sad in accordance with the output condition of the corresponding video information. Then, the audio signal Sad, which is time-adjusted to synchronize with the corresponding video information, is outputted to the audio decoder 93. Then, a predetermined decoding process is applied thereat to the audio signal Sad, and it is outputted as a decoded audio signal Sadd to the D/A converter 203 and the output control unit 204. The demodulated audio signal Sadd is a digital signal, and the D/A converter 203 converts it to an analog audio signal Saa and outputs it to an analog audio output terminal. The output control unit 204 is controlled by a control signal Sca supplied from the system controller 100, and adds an additional information for the digital interface to output a digital audio signal Sda. While the contents of the control signal Sca is determined dependently upon the audio copy information, the detail of which will be described later.

If it is detected by the system controller 100 that it is necessary to temporarily stop (pause) the audio voice in the reproduction immediately after accessing, a pause signal Scp is outputted from the system controller 100 to the audio decoder 93, so that the output of the decoded audio signal Sadd is stopped temporarily at the audio decoder 93.

The PCI buffer 94, to which the PCI signal Spc is inputted, consists of a FIFO memory, for example. The PCI buffer 94 temporarily stores the inputted PCI signal Spc and outputs it to the PCI decoder 95. The video copy information CV and the audio copy information CA shown in FIG. 4 are included in the PCI signal and are accumulated in the PCI buffer 94. The PCI buffer 94 is to synchronize the PCI packet 50, which is included in the PCI signal Spc, with the video information, the audio information and the sub picture information corresponding to the PCI packet 50, and apply the PCI packet 50 to the video information and the like. Then, from the PCI signal Spc, which is synchronized with the corresponding the video information and the like by the PCI buffer 94, a high light information included in the PCI packet 50 is separated or extracted by the PCI decoder 95, and is outputted as a high light signal Shi to the high light buffer 96. The portion of the PCI packet 50 other than the high light information is outputted as a PCI information signal Spci to the system controller 100. Accordingly, the video copy information CV and the audio copy information CA are supplied to the system controller 100 in a manner being included in the PCI information signal Spci.

The high light buffer 96, to which the high light signal Shi is inputted, consists of a FIFO memory, for example. The high light buffer 96 temporarily stores the inputted high light signal Shi and outputs it to the high light decoder 97. The high light buffer 96 is to time-compensate the high light signal Shi so as to precisely perform a change in the display condition of the selection item, which corresponds to the high light information, in correspondence with the sub picture signal Ssp which includes the video information for the high light information. Then, the time-compensated high light signal Shi is decoded by the high light decoder 97, and the information included in the high light signal Shi is outputted as a decoded high light signal Shid to the system controller 100. Here, the system controller 100 outputs the aforementioned high light control signal Sch to change the display condition by the high light information, on the basis of the decoded high light signal Shid.

On the basis of the control information Sc inputted from the system buffer 85, the PCI information signal Spci inputted from the PCI decoder 95 and an input signal Sin inputted from the input unit 98 such as a remote controller, the system controller 100 outputs the aforementioned switch signal Ssw2, the language selection signal S1c, the pause signal Scp and the high light control signal Sch to correctly perform the reproduction corresponding to those input signals, and also outputs a display signal Sdp to display an operation condition etc. of the reproducing apparatus S2 to the display unit 99 such as the liquid crystal device. Further, on the basis of the copy flags CF1 to CF3, the video copy information CV and the audio copy information CA which are included in the PCI information signal Scpi, the system controller 100 outputs the control signal Scv to the output control unit 202, outputs the control signal Sca to the output control unit 204, and outputs the control signal Sss to an output terminal outside of the reproduction device.

Further, the system controller 100 outputs a seamless control signal Scsl corresponding to the track jump process, to the drive controller 101, when it detects by the PCI information signal Spci or the like that it is necessary to perform the track jump process such as a search in order to perform the seamless reproduction.

Then, the drive controller 101, to which the seamless control signal Scsl is inputted, outputs a drive signal Sd to the spindle motor 102 or the slider motor 103. By this drive signal Sd, the spindle motor 102 or the slider motor 103 moves the optical pickup 80 such that the record position to be reproduced on the DVD 1 is irradiated with the light beam B (refer to an arrow of a broken line in FIG. 7), and the spindle motor 102 CLV-controls (Constant Linear Velocity-controls) the rotation number of the DVD 1. Along with this, the drive controller 101 outputs the aforementioned switch signal Ssw1 on the basis of the seamless control signal Scsl, so as to open the stream switch 82 when the demodulation signal Sdm is not outputted from the demodulate and correct unit 81 while the optical pickup 80 is being moved, and so as to close the stream switch 82 when the demodulation signal Sdm is started to be outputted, so that the demodulation signal Sdm is outputted to the track buffer 83.

Next, a copy management process by the reproduction apparatus S2 will be described with reference to FIG. 8. FIG. 8 is a flowchart illustrating an example of the copy management according to the present invention. At the time of copying, in general, a reproducing apparatus and a recording apparatus are connected to each other, and recorded information is supplied from the reproducing apparatus to the recording apparatus. In the following description, the reproducing apparatus S2 functions as the reproducing side apparatus which supplies the information to the recording side apparatus connected thereto. In addition, the following process is performed mainly by the system controller 100 which controls other components.

If the video/audio copy information of the recorded information to be copied is "01" indicating that the copy is permitted only once, it is necessary to change the video copy information from "01" to "00" indicating copy prohibition when once copied information is further copied to other recording medium. This can be achieved by two different methods. A first method is that the reproducing apparatus changes the video/audio copy information and then supplies the changed video/audio copy information to the recording apparatus. A second method is that the reproducing apparatus outputs the video/audio copy information as it is (i.e., with no change), and the recording apparatus changes the video/audio copy information and then records it on the recording medium. Specifically, the first method changes the video/audio copy information of the recorded information to be copied from "01" indicating only-once permission to "00" indicating prohibition, and then outputs it to the recording apparatus. On the other hand, in the second method, the reproducing apparatus outputs the video/audio copy information without change, as it is "01", and also outputs a special control signal indicating that the information being supplied to the recording apparatus is copy-permitted only once, to the recording apparatus, by adding the special control signal to the additional information Svd, Sda for the digital interface. The recording apparatus refers to the special control information and changes the video/audio copy information from "01" to "00" before recording it on the recording medium. Although the second method is more general, in the following description, the first method is explained first, and then the second method is explained.

Referring to FIG. 8, first, the user determines the title X to be copied, and inputs the instruction to the reproducing apparatus S2 that the title X is to be copied. The system controller 100 searches for the video manager 2 corresponding to the selected title X, reads out the copy flag CF1 recorded in it (step S1) and checks the contents of the copy flag CF1 (step S2). If the copy flag is "11", all titles under the management by the video manager 2 are copy-permitted, and therefore the title X selected by the user is also copy-permitted. Therefore, the system controller 100 searches for the VTS 3 in which the head PGC of the title X is included (step S3), and subsequently searches for the head PGC (step S4). Then, the system controller 100 reproduces the information of the title X according to the PGC thus detected (step S5). In reproduction, the system controller 100 refers to the video/audio copy information recorded in the navi-pack 41 in each VOBU 30. In this case, since the copy flag CF1 is "11", the video/audio copy information is one of "01" indicating that the copy is permitted only-once and "11" indicating that the copy is permitted for unlimited times.

If the video/audio information is "01" indicating that the copy is permitted only once, in the copy system in which the video/audio information is changed in the reproducing apparatus side, the system controller 100 changes the video/audio copy information to "00", and sends the control information Scv and Sca including the video/audio copy information thus changed (i.e., "00") to the output control units 202 and 204. On the other hand, in the copy system in which the video/audio information is changed in the recording apparatus side, the system controller 100 dose not change the video/audio copy information but adds the special control information indicating that the copy of the information is permitted only once to the additional information to be supplied to the digital interface, and includes the additional information in the control information Scv and Sca to be supplied to the output control unit 202 and 204. The output control unit 202 and 204 add the additional information for the digital interface to the digital signals Svp and Sadd inputted, and outputs them as the signal Sva and Sda, respectively, from the output terminals. The recording apparatus receives these signals and records them on the recording medium. At this time, the recording apparatus changes the video/audio copy information from "01" to "00" for the information which video/audio copy information is "01" indicating only-once copy permission.

On the other hand, if the video/audio copy information is "11", the system controller 100 supplies the control information Scv and Sca to the output control units 202 and 204 without changing the video/audio copy information. The output control units 202 and 204 add the additional information for the digital interface to the digital signals Svp and Sadd inputted, and outputs them as the signals Sva and Sda, respectively, from the output terminals. The recording apparatus receives these signals and records them on the recording medium (step S5). Then, it is checked whether or not the PGC subsequent to the current PGC exists (step S6). If there is subsequent PGC, the process returns to step S4 to repeat the above process. If there is no subsequent PGC, the process ends.

If it is judged that the copy flag CF1 is "00" in step S2, all titles under the management by the video manager 2 is copy-prohibited, and hence the title X selected by the user is also copy-prohibited. Therefore, the system controller 100 immediately notifies the user that the selected title is copy-prohibited by displaying a message on the display, for example, and ends the process (step S7). In this case, the selected title is not reproduced and hence the information is prevented from being copied.

If it is judged in step S2 that the copy flag CF1 is "01", the system controller 100 searches for the VTS 3 in which the head PGC of the title X selected by the user belongs to, and refers to the copy flag CF2 included in the control data 11 in that VTS 3 (step S9). If the copy flag CF2 is "11", all titles in that VTS 3 are copy-permitted, and hence the process jumps to step S4 where the title X is reproduced (steps S4 to S6). In this case, if the video/audio copy information is "01" indicating the only-once copy permission, the process same as that described above is performed. Namely, in the system which changes the copy information on the reproducing apparatus side, the reproducing apparatus changes the copy information before outputting it. On the other hand, in the system which changes the copy information on the recording apparatus side, the reproducing apparatus outputs the copy information as it is (i.e., "01"), and the recording apparatus changes it to "00" by referring to the special control information which is also supplied to the recording apparatus along with the video and/or audio information. If the copy flag CF2 is "00", all titles in that VTS 3 are set copy-prohibited, and hence the process jumps to step S7 where the process ends after notifying the user that the information is copy-prohibited (step S7).

In step S9, if the copy flag CF2 is "01", the information in the VTS 3 includes both the copy-permitted information and the copy-prohibited information. The system controller 100 checks the copy flag CF3 included in the head PGC of the title X that is searched for in step S8 (step S10).

If the copy flag CF3 is "11", the recorded information is all copy-permitted, and the system controller 100 reads out the PGC (step S11) and performs the reproduction according to it (step S12). Also in this case, the video/audio copy information should be changed, like step S5, if the information is copy-permitted only-once. Therefore, in the system which changes the video/audio copy information on the reproducing apparatus side, the reproducing apparatus changes the information to "00" and then outputs it. On the other hand, in the system which changes the video/audio copy information on the recording apparatus side, the reproducing apparatus outputs the video/audio copy information as it is (i.e., "01"), and the recording apparatus changes the information by referring to the contents of the special control information in the additional information which indicates that the information is only-once copy-permitted.

If it is judged that the copy flag CF3 is "00" in step S10, the recorded information controlled by the PGC are all copy-prohibited, and the user is immediately notified so (step 13). Subsequently, it is confirmed by user that he or she wishes or she wishes to continue the copying process (step S14). This is because, there may be a case that the user wishes to quit the copy process if some portions of the information in the selected title X can not be copied (i.e., copy-prohibited). Namely, if the user feels that the copy is not needed if all portions of the selected title X can not be copied, he or she instructs so (step S14:No), and the process ends. On the other hand, if the user wishes to continue the copy process even if some portions can not be copied, he or she instruct so (step S14:YES), and the process goes to the process of next PGC (step S18).

If the copy flag CF3 is "01" in step S10, the recorded information controlled by that PGC includes both the copy-permitted information and the copy-prohibited information. The system controller 100 notifies the user that the selected information (title) includes the copy-prohibited information (step S15), and confirms whether the user still wishes to continue the copy process or not (step S16). If the user instructs to continue the copy process (step S16:YES), the system controller 100 reads out the recorded information according to that PGC. At this time, the video copy information CV and the audio copy information CA in each navi-pack 41 are successively read out, and the copy possibility is judged for every VOBUs 30. Namely, if the video copy information CV and the audio copy information CA are "00", the VOBUs 30 are not reproduced. Alternative to this, the system controller 100 stops the outputting of the digital data from the output control units 202 and 204 by using the control signals Scv and Sca. If the video copy information CV and the audio copy information CA are "01", only the recorded information which is set copy-permitted is reproduced. By this, since the information is not reproduced in the portions where the copy is prohibited, the copy is not performed. If the video copy information CV and the audio copy information CA are "01", the copy information should be changed at the time of recording. In the system which changes the copy information at the reproducing apparatus side, the reproducing apparatus outputs the copy information after changing it to "00". In the system which changes the copy information at the recording apparatus side, the reproducing apparatus outputs the copy information without change, and the recording apparatus changes the copy information to "00" by referring to the additional information.

After the above process, the system controller 100 judges in step S18 whether or not there exists subsequent PGC, and, if it exists, the process returns to step S10 to repeat the process. On the other hand, if the process reaches the last PGC (i.e., there is no subsequent PGC) (step S18:NO), the process ends.

The above description is given on the assumption that the video copy information and the audio copy information are the same. However, sometimes they may be different, for example, in the case where only the audio signal is copy-prohibited. In such a case, the system controller 100 checks both of them and reproduces only the copy-permitted information. Also in that case, the video/audio copy information is changed at the reproducing apparatus side or the recording apparatus side as described above.

As described above, in the present invention, the copy flags are recorded on a plurality of hierarchical layers. Therefore, the copy is immediately started if all of the information units selected by the user are set copy-permitted while the copy is not started and the user is notified the copy prohibition of the selected information if all of the information units selected by the user are set copy-prohibited. Therefore, it is possible to avoid performing the copy in vain. Further, if the information units selected by the user include both the copy-prohibited information and the copy-permitted information, the system notifies of it to the user and manages the copy operation according to the further instruction from the user, thereby enabling the copy management to meet the user's demand.

Next, applications of the present invention to various copying systems will be examined. The above description is mainly directed to the case where the reproducing apparatus S2 is used as the reproducing side apparatus and the digital signal output is controlled. Namely, the reproducing apparatus S2 does not output the digital data in the portions set copy-prohibited. By this, the illegal copy may be securely prohibited whatever the type of the recording side apparatus is. However, in practice, it is general that the reproducing side apparatus and the recording side apparatus are simultaneously controlled to perform a copy operation. The application of the present invention to some systems will be described below.

Figure 9A:
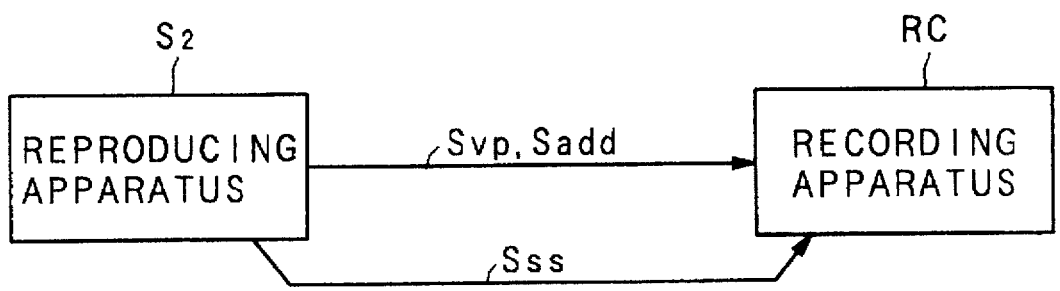
FIGS. 9A, 9B and 10 are block diagrams illustrating copy systems according to the present invention.

In FIG. 9A, there is shown a system in which the reproducing side apparatus takes the initiative in the copy operation and supplies a control signal to the recording side apparatus. In this system, the reproducing apparatus S2 according to the present invention functions as the reproducing side apparatus. Namely, the system controller 100 in the reproducing apparatus S2 detects the copy flags CF1 to CF3, the video copy information CV and the audio copy information CA recorded in the copy source DVD, and judges the permissibility of copying. If the recorded information (title) to be copied is set copy-permitted, the reproducing apparatus S2 supplies to the recording apparatus RC the digital video signal Svd and the digital audio signal Sadd as well as the control signal Sss indicating that the information is copy-permitted. If the information is set only-once copy-permitted, the copy information should be changed as described above. Hence, in the system which changes the copy information on the reproducing side apparatus, the reproducing apparatus S2 changes the copy information to "00" and then outputs it. On the other hand, in the system which changes the copy information on the recording side apparatus, the reproducing apparatus S2 outputs the copy information as it is "01", and the recording apparatus RC changes it to "00" by referring to the additional information.

On the other hand, if all recorded information to be copied is set copy-prohibited, the system notifies the user that the copy is prohibited, and the reproduction is not performed. If some portions of the recorded information to be copied are set copy-prohibited, the reproducing apparatus S2 supplies to the recording apparatus RC the control signal Sss indicating the information portion set copy-prohibited. The recording apparatus RC does not record the information at the portions of copy-prohibited. In this case, the output of the digital video signal Svp and the digital audio signal Sadd from the reproducing apparatus S2 may be stopped. Alternatively, those signals may be kept on being outputted to the recording apparatus RC if the recording by the recording apparatus RC is securely stopped by supplying the control signal Sss thereto.

Figure 9B:
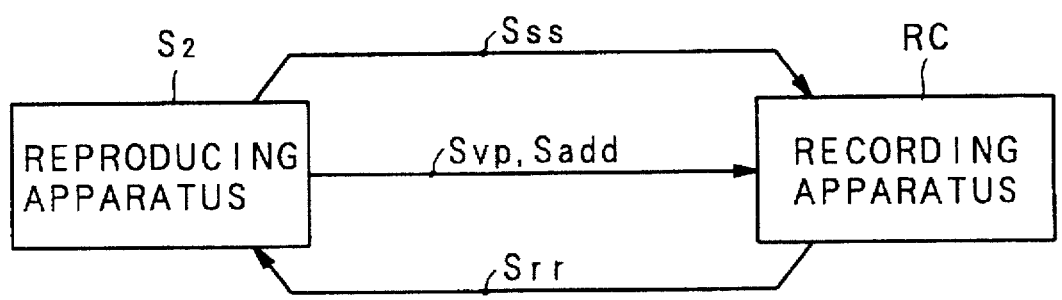

FIG. 9B shows a different kind of system in which the recording apparatus RC takes the initiative in the copy operation. The reproducing apparatus S2 according to the present invention is used as the reproducing side apparatus. When the user designates the title X to be copied and instructs the copy operation, the recording apparatus RC outputs to the reproducing apparatus the instruction to examine the copy flag of the selected title X by the control signal Srr. The reproducing apparatus S2 examines the copy flags CG1 to CF3 corresponding to the selected title X, and notifies the result to the recording apparatus RC by the control signal Sss. The recording apparatus RC checks the contents of the copy flags thus examined, and, if they indicate that the title X is copy-prohibited, the recording apparatus RC notifies it to the user and then ends the process. On the other hand, if the selected title X is copy-permitted, the recording apparatus RC starts a preparation and then becomes a pause state when the preparation is completed. Then, the recording apparatus RC outputs to the reproducing apparatus S2 the control signal Srr which requests the reproducing apparatus S2 to output the recorded information of the selected title X. When the supply of the recorded information starts, the recording apparatus RC releases the pause state and starts the recording.

If the selected title X includes the copy-prohibited information and the copy-permitted information, the reproducing apparatus may be configured to stop the supply of the recorded information at the copy-prohibited information portion. Alternatively, the system may be so configured that the reproducing apparatus S2 informs of the copy-prohibited portion to the recording apparatus RC by the control signal Sss, and the recording apparatus RC stops the recording at the copy-prohibited portions. In such a system, the recording side apparatus is provided with an ability to recognize and process the control information relating to the copy flags supplied. The recording signals Svp and Sadd may be transmitted by a common interface.

Figure 10:
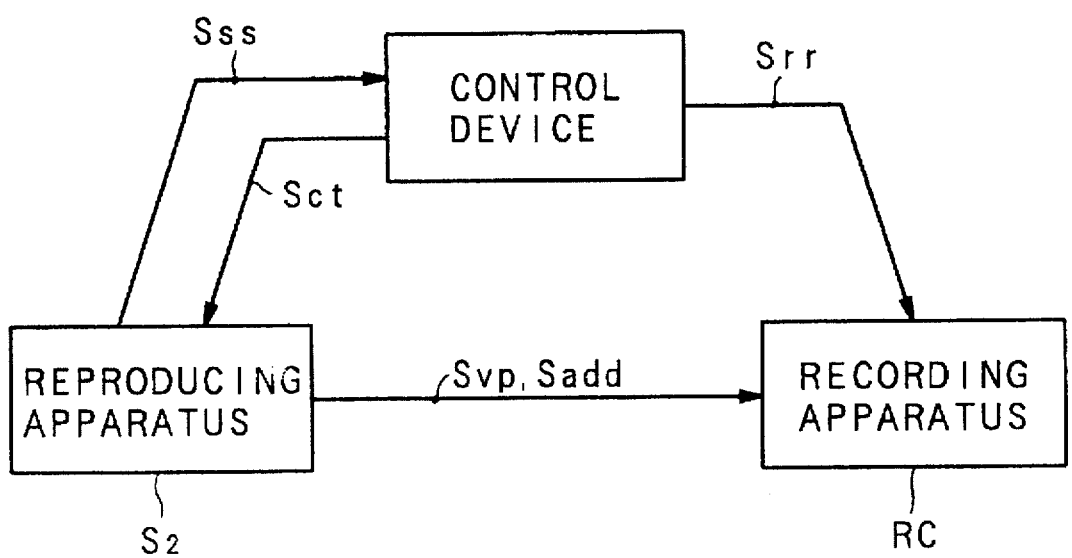

FIG. 10 shows another system in which a control device CT is provided and the copy is carried out under the control by the control device CT. The reproducing apparatus S2 according to the present invention is used at the reproducing side. When the user designates the title X to be copied and instructs the start of the copy operation to the control device CT, the control device CT requests the reproducing apparatus S2 by the control signal Sct to examine the copy flags of the selected title X. In response, the reproducing apparatus S2 examines the copy flags CF1 to CF3, and notifies the results to the control device CT by the control signal Sss. The control device CT checks the contents of the copy flags, and, if the selected title X is copy-prohibited, notifies so to the user and ends the process. On the other hand, if the selected title X includes the copy-permitted portion, the control device CT transmits the control signal Srr to make the recording apparatus RC start the preparation. The recording apparatus RC makes the preparation and becomes the pause state. Then, the control device CT supplies the reproduction start instruction to the reproducing apparatus S2 by the control signal Srr, and supplies the instruction to start the recording to the recording apparatus RC at the same time by the control signal Srr. In case that the title X selected by the user includes the copy-prohibited information and the copy-permitted information, the control device CT always monitors the copy flag CF3 in the PCI data which is included in the title being reproduced by the reproducing apparatus S2, and stops the supply of the information from the reproducing apparatus S2 at the copy-prohibited portion, or alternatively stops the recording by the recording apparatus RC at the copy-prohibited portions.

As described above, according to the present invention, it is possible to perform an effective and accurate copy management in various copy systems.

What is claimed is:

1. An information recording medium comprising a data structure stored therein and including:
    a plurality of recorded information pieces each of which being independent of each other;
    a plurality of individual copy information pieces each corresponding to each one of said recorded information pieces, each of said individual copy information pieces indicating whether or not each of said corresponding recorded information pieces is copy-prohibited,;
    a plurality of control information pieces each prescribing a control method of reproducing said plurality of recorded information pieces, groups of said plurality of control information pieces constituting hierarchical multiple layers, said plurality of control information pieces comprising aggregate copy information pieces prescribing whether or not said plurality of recorded information pieces controlled by a control information piece include copy-prohibited recorded information piece.

2. An information recording medium according to claim 1, wherein each of said aggregate copy information pieces including one of the following three types of information:
    a first type information indicating that all of said recorded information pieces are copy-permitted;
    a second type information indicating that all of said recorded information pieces are copy-prohibited; and
    a third type information indicating that said recorded information pieces include copy-permitted information piece and copy-prohibited information piece.

3. An information recording medium according to claim 1, wherein each of said plurality of individual copy information pieces comprises one of the following copy information pieces:
    a first individual copy information piece indicating that the recorded information piece is copy-permitted only once; and
    a second individual copy information piece indicating that the recorded information piece is copy-permitted for unlimited times.

4. An information recording medium according to claim 1, wherein said control information pieces at each hierarchical layer include the aggregate copy information pieces.

5. A reproducing apparatus for reproducing information from an information recording medium according to claim 1, said apparatus comprising:
    a copy instruction inputting means for inputting a copy instruction and a designation of a copy-subject information to be copied;
    a copy information detecting means for detecting said aggregate copy information pieces relating to said copy-subject information in an order from the ones at upper hierarchical layer to ones at lower hierarchical layer; and
    a notifying means for immediately notifying the user that the copy-subject information is copy-prohibited if said copy information detecting means detects that all of said recorded information pieces corresponding to said copy-subject information are copy-prohibited.

6. A reproducing apparatus according to claim 5, further comprising an output means for immediately outputting recorded information pieces corresponding to the copy-subject information if said copy information detecting means detects that all of said recorded information pieces corresponding to said copy-subject information are copy-permitted.

7. A reproducing apparatus according to claim 5, wherein, said copy information detecting means detects said aggregate copy information pieces at lower hierarchical layers when it detects that at least one of said recorded information piece corresponding to the copy-subject information is copy-prohibited.

8. A reproducing apparatus according to claim 5, further comprising an output means for referring to the individual copy information pieces and outputting only the recorded information pieces which are copy-permitted if said copy information detecting means detects that at least one of the plurality of recorded information piece controlled by the control information piece at the lowest hierarchical layer is copy-prohibited.

9. An information recording apparatus comprising:
    a first information producing means for producing a plurality of recorded information pieces each of which being independent of each other;
    a second information producing means for producing a plurality of individual copy information pieces prescribing whether or not said individual recorded information pieces are copy-prohibited;
    a third information producing means for producing a plurality of control information pieces prescribing a control method of reproducing said plurality of recorded information pieces;
    a hierarchical layer structure producing means for aggregating said plurality of control information pieces to form a multiple layer hierarchical structure of said control information pieces;
    a fourth information producing means for referring to said individual copy information pieces to produce aggregate copy information pieces prescribing for each of said control information pieces whether or not said plurality of recorded information pieces controlled by said control information piece include copy-prohibited recorded information piece; and
    an arranging means for arranging said recorded information pieces, said individual copy information pieces, said control information pieces and said aggregate copy information pieces on an information recording medium.

* * * * *